(12) United States Patent
Bradford et al.

(10) Patent No.: US 7,739,477 B2
(45) Date of Patent: Jun. 15, 2010

(54) MULTIPLE PAGE SIZE ADDRESS TRANSLATION INCORPORATING PAGE SIZE PREDICTION

(75) Inventors: Jeffrey Powers Bradford, Rochester, MN (US); Jason Nathaniel Dale, Austin, TX (US); Kimberly Marie Fernsler, Round Rock, TX (US); Timothy Hume Heil, Rochester, MN (US); James Allen Rose, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/733,520

(22) Filed: Apr. 10, 2007

(65) Prior Publication Data

US 2007/0186074 A1 Aug. 9, 2007

Related U.S. Application Data

(63) Continuation of application No. 11/035,556, filed on Jan. 14, 2005, now Pat. No. 7,284,112.

(51) Int. Cl.
 G06F 12/00 (2006.01)
 G06F 13/00 (2006.01)
 G06F 13/28 (2006.01)
 G06F 9/26 (2006.01)
 G06F 9/34 (2006.01)

(52) U.S. Cl. .................. 711/206; 711/169; 711/202; 711/207
(58) Field of Classification Search ............... 711/206
 See application file for complete search history.

(56) References Cited

U.S. PATENT DOCUMENTS

| 6,205,531 | B1 | 3/2001 | Hussain | |
|---|---|---|---|---|
| 6,625,715 | B1 | 9/2003 | Mathews | |
| 7,159,095 | B2 | 1/2007 | Dale et al. | |
| 2002/0133685 | A1* | 9/2002 | Kalyanasundharam | 711/207 |
| 2003/0177335 | A1* | 9/2003 | Luick | 711/210 |
| 2005/0027961 | A1* | 2/2005 | Zhang | 711/207 |
| 2005/0071601 | A1 | 3/2005 | Luick | |

OTHER PUBLICATIONS

"Concurrent Support of Multiple Page Sizes on a Skewed Associative TLB", Andre Seznec, IEEE Transaction on Computers, Oct. 9, 2003.

* cited by examiner

*Primary Examiner*—Christian P Chace
*Assistant Examiner*—Ryan Bertram
(74) *Attorney, Agent, or Firm*—Wood, Herron & Evans LLP

(57) ABSTRACT

Page size prediction is used to predict a page size for a page of memory being accessed by a memory access instruction such that the predicted page size can be used to access an address translation data structure. By doing so, an address translation data structure may support multiple page sizes in an efficient manner and with little additional circuitry disposed in the critical path for address translation, thereby increasing performance.

27 Claims, 5 Drawing Sheets

MULTIPLE PAGE SIZE ADDRESS TRANSLATION INCORPORATING PAGE SIZE PREDICTION

CROSS-REFERENCE TO RELATED APPLICATIONS

This application is a continuation of U.S. patent application Ser. No. 11/035,556, entitled "MULTIPLE PAGE SIZE ADDRESS TRANSLATION INCORPORATING PAGE SIZE PREDICTION", filed on Jan. 14, 2005 by Jeffrey Powers Bradford et al., now U.S. Pat. No. 7,284,112 the entire disclosure of which is incorporated by reference herein.

FIELD OF THE INVENTION

The invention relates to computers and data processing systems, and in particular to address translation used therein.

BACKGROUND OF THE INVENTION

Memory management, i.e., the operations that occur in managing the data stored in a computer, is often a key factor in overall system performance for a computer. Among other tasks, memory management oversees the retrieval and storage of data on a computer, as well as manages certain security tasks for a computer by imposing restrictions on what users and computer programs are permitted to access.

Modern computers typically rely on a memory management technique known as virtual memory management to increase performance and provide greater flexibility in computers and the underlying architectural designs upon which they are premised.

With a virtual memory system, the underlying hardware implementing the memory system of a computer is effectively hidden from the software of the computer. A relatively large virtual memory space, e.g., 64-bits or more in width, is defined for such a computer, with computer programs that execute on the computer accessing the memory system using virtual addresses pointing to locations in the virtual memory space. The physical memory devices in the computer, however, are accessed via "real" addresses that map directly into specific memory locations in the physical memory devices. Hardware and/or software in the computer are provided to perform "address translation" to map the real memory addresses of the physical memory to virtual addresses in the virtual memory space. As such, whenever a computer program on a computer attempts to access memory using a virtual address, the computer automatically translates the virtual address into a corresponding real address so that the access can be made to the appropriate location in the appropriate physical device mapped to the virtual address.

One feature of virtual addressing it that is not necessary for a computer to include storage for the entire virtual memory space in the physical memory devices in the computer's main memory. Instead, lower levels of storage, such as disk drives and other mass storage devices, may be used as supplemental storage, with memory addresses grouped into "pages" that are swapped between the main memory and supplemental storage as needed.

In addition, some computer designs also include the concept of segmentation, which partitions the virtual memory into different segments (each mapped to blocks of pages) in order to facilitate memory protection, simplify the handling of large and growing data structures, and otherwise provide greater flexibility for performing memory management when multiple processes are capable of being handled in a computer at any given time. When segmentation is used, an additional layer of indirection is used, requiring an additional translation to be performed. Typically, in systems incorporating segmentation and paging, computer programs access the memory system using "effective" addresses that map to virtual addresses, thus requiring a translation first from effective to virtual address, then from virtual to real address.

Due to the frequency of access requests in a computer, address translation can have a significant impact on overall system performance. As such, it is desirable to minimize the processing overhead associated with the critical timing path within which address translation is performed.

Address translation in a virtual memory system typically incorporates accessing various address translation data structures. One such structure, referred to as a page table, includes multiple entries that map virtual addresses to real addresses on a page-by-page basis. Likewise, for handling segmentation, a segment table is often provided, including entries that map effective addresses to virtual addresses on a segment-by-segment basis.

Often, due to the large number of memory accesses that constantly occur in a computer, the number of entries required to map all of the memory address space in use by a computer can be significant, and require the entries to be stored in main storage, rather than in dedicated memory, which makes accessing such entries prohibitively slow. To accelerate address translation with such a scheme, high speed memories referred to as translation lookaside buffers (TLB's) and segment lookaside buffers (SLB's) are typically used to cache recently-used entries for quick access by the computer. If a required entry is not stored in a TLB or SLB, a performance penalty is incurred in loading the entry from main storage; however, typically the hit rate on TLB's and SLB's is exceptionally high, and the penalty associated with loading entries from main storage is more than offset by the performance gains when entries are immediately accessible from the TLB and SLB.

In still other designs, an additional level of caching may be used to further accelerate performance, by providing an effective to real address translation (ERAT) table that includes entries providing direct mappings between effective and real addresses. Thus, an ERAT table effectively includes information from both the SLB and the TLB to eliminate the need to perform two levels of translation. In some designs, separate data and instruction ERAT tables are respectively provided in close proximity to the instruction and data processing logic in a processor to minimize the effects of address translation on the critical performance paths in the processor.

Originally, paging was based on fixed page sizes, e.g., 4K or 4096 addressable locations per page. With the use of segmentation, however, different page sizes may be supported in different segments. Smaller page sizes are often optimal for efficient use of a memory system, particularly when many processes are running concurrently in a computer. However, as the memory requirements of computers and the programs running thereon continue to increase, the number of pages of memory required by any given process or program continues to increase, and as a result, larger page sizes may be more efficient for many situations.

Some conventional address translation schemes have handled larger page sizes by allocating multiple entries in the TLB and page table for each large page, e.g., for a 16K page in a system that supports a minimum page size of 4K, four (16K/4K) entries may be used. However, for larger pages, the number of entries required to represent such pages can effectively reduce the capacity of TLB's and ERAT's, and thus lead to higher miss rates and lower performance.

Other designs allocate a single page table entry to each page regardless of size, and typically provide in the entry, or in the segment information for the segment within which the associated page is resident, an indication of the page size for that entry.

Multiple page sizes complicate address translation predominantly due to the different allocation of bits in effective addresses directed to different page sizes. In particular, addresses are often partitioned for the purposes of address translation into offset bits and index bits, with the offset bits pointing to a specific address in a page. For a 4K page, 12 offset bits are required to address every location in a page, while for a 16K page, 14 offset bits are required. The index bits, which are typically the higher order bits from the offset bits, are then used to identify the page, and thus, the index bits are used to access address translation data structures such as the ERAT's. When multiple page sizes are supported, however, the size of a page must be known before the appropriate translation data structure can be accessed, so the proper bits can be used as the index into the structure.

As a result, conventional designs have often required that a lookup be performed to determine the page size for a given address prior to accessing a translation data structure such as an ERAT, typically by accessing the SLB. By doing so, however, an additional step is added to the critical path for address translation, and thus, the lookup has an adverse impact on performance.

Other designs have attempted to address the complications that arise from multiple page sizes, e.g., by using fully associative translation data structures, using separate translation data structures per page size, or using skewed-associative translation data structures. Fully associative translation data structures, however, are known to be costly in terms of size, speed and power. Separate translation data structures for each page size would also increase the critical path, and raise a concern as to efficiency in applications where one page size predominates. Likewise, skewed-associative translation data structures would also likely raise a concern as to efficiency when one page size predominates.

Therefore, a significant need continues to exist for a manner of efficiently and cost effectively supporting multiple page sizes in a virtual memory system with minimal impact on performance.

SUMMARY OF THE INVENTION

The invention addresses these and other problems associated with the prior art by utilizing page size prediction to predict a page size for a page of memory being accessed by a memory access instruction, and then using that predicted page size to access an address translation data structure. By doing so, an address translation data structure may support multiple page sizes in an efficient manner and with little additional circuitry disposed in the critical path for address translation, thereby increasing performance.

Therefore, consistent with one aspect of the invention, an address translation data structure that is configured to translate an address associated with a memory access instruction, and that supports multiple page sizes, is access used using a predicted page size for the page of memory being accessed by the memory access instruction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed and illustrated hereinafter essentially utilize page size prediction logic to predict the page size of a page of memory being accessed by a memory access instruction. Once predicted, the predicted page size can then be used in connection with accessing an address translation data structure to perform address translation on an address associated with the memory access instruction.

An address translation data structure consistent with the invention may include practically any buffer, table, cache or other hardware-implemented data structure that stores address translation information. In the embodiments discussed hereinafter, for example, an address translation data structure is implemented as an effective to real address translation (ERAT) table or array, and specifically, a DERAT array that is disposed in the control path for accessing a data cache in a processor. It will be appreciated that other address translation data structures may utilize page size prediction as described herein, including instruction ERAT's, combined ERAT's, various types of translation lookaside buffers (TLB's), segment lookaside buffers (SLB's), etc. The invention is therefore not limited to the particular implementations discussed herein.

Figure 1:
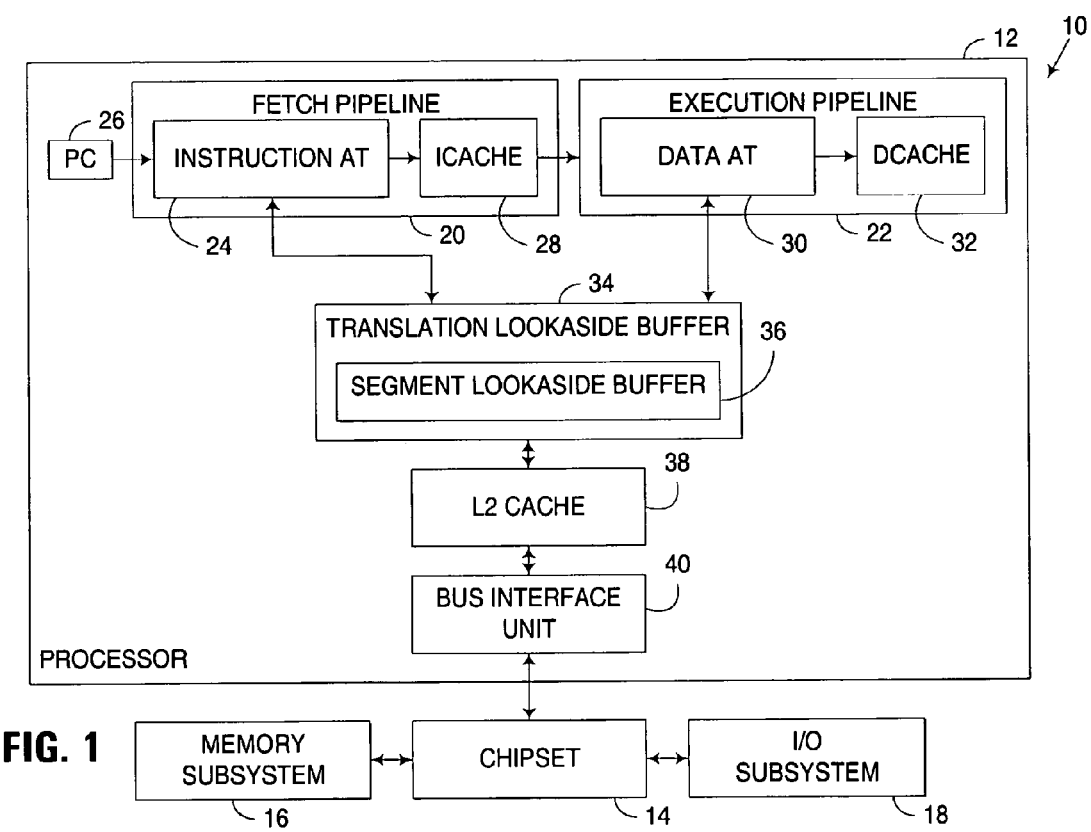
FIG. 1 is a block diagram of an exemplary apparatus utilizing a processor incorporating address translation with page size prediction consistent with the invention.

Turning to the Drawings, wherein like numbers denote like parts throughout the several views, FIG. 1 illustrates a computer 10 incorporating a processor 12 that represents one suitable environment within which address translation with page size prediction may be implemented. Computer 10 generically represents, for example, any of a number of multi-user computers such as a network server, a midrange computer, a mainframe computer, etc. However, it should be appreciated that the invention may be implemented in practically any device capable of utilizing processor devices, including other computers and data processing systems, e.g., in single-user computers such as workstations, desktop computers, portable computers, and the like, or in other programmable electronic devices (e.g., incorporating embedded controllers and the like), such as set top boxes, game machines, etc.

Processor 12 is typically coupled to a chipset 14 that interfaces the processor, and optionally, a plurality of processors, to a memory subsystem 16 and an input/output subsystem 18. Any number of alternate computer architectures may be used in the alternative.

Computer 10, or any subset of components therein, may also be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more logic circuits that circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy disks, hard disk drives, CD-ROM's, and DVD's, among others, and transmission type media such as digital and analog communications links.

Also shown in FIG. 1 are the principal address translation-related structures and logic circuits utilized in a typical processor. These structures and logic circuits are illustrated in a highly functional and simplified manner, as it will be appreciated that address translation consistent with the invention may be utilized in a wide variety of alternate processor and memory architectures.

In this generalized representation, a fetch pipeline 20 and an execution pipeline 22 are illustrated, with the fetch pipeline including instruction address translation logic 24 fed by a program counter 26, representing a current address for program code being executed by the processor. The program counter stores a current address being executed in an effective address format, which is translated by the instruction address translation logic 24 into a real address that is used to retrieve instructions from an instruction cache 28. Once the instructions are received, they are passed to the execution pipeline, which generates memory access requests directed to effective addresses. The effective addresses are translated to real addresses using data address translation logic 30, which real addresses are then used to access a data cache 32.

It will be appreciated that the fetch and execution pipelines may incorporate a number of advanced functions, e.g., branch prediction, multiple execution units, etc. It will also be appreciated that the data and instruction address translation logic may be implemented in combined address translation logic in the alternative.

Each of address translation logic 24, 30 typically stores cached address translation information that is retrieved from a lower level data structure, e.g., a translation lookaside buffer (TLB) 34, which may also include a segment lookaside buffer (SLB) 36 in some embodiments. The TLB may further access additional address translation data structures maintained in main memory, e.g., page and segment tables, which are accessed via an L2 cache 38 and bus interface unit 40 that interfaces the processor with chipset 14.

It will be appreciated that the architecture illustrated in FIG. 1 is merely exemplary in nature, and the invention may be utilized in a wide variety of other architectures utilizing address translation. For example, the address translation logic in the illustrated embodiment may be used to translate effective addresses to real addresses, without an intermediate translation to a virtual address due to caching of address translation information in an ERAT. In other embodiments, however, address translation consistent with the invention may be performed between effective and virtual addresses, between virtual and real addresses, and even between any non-real addresses and real addresses, e.g., when segmentation is not used. Therefore the invention is not limited to the particular implementations discussed herein.

Figure 2:
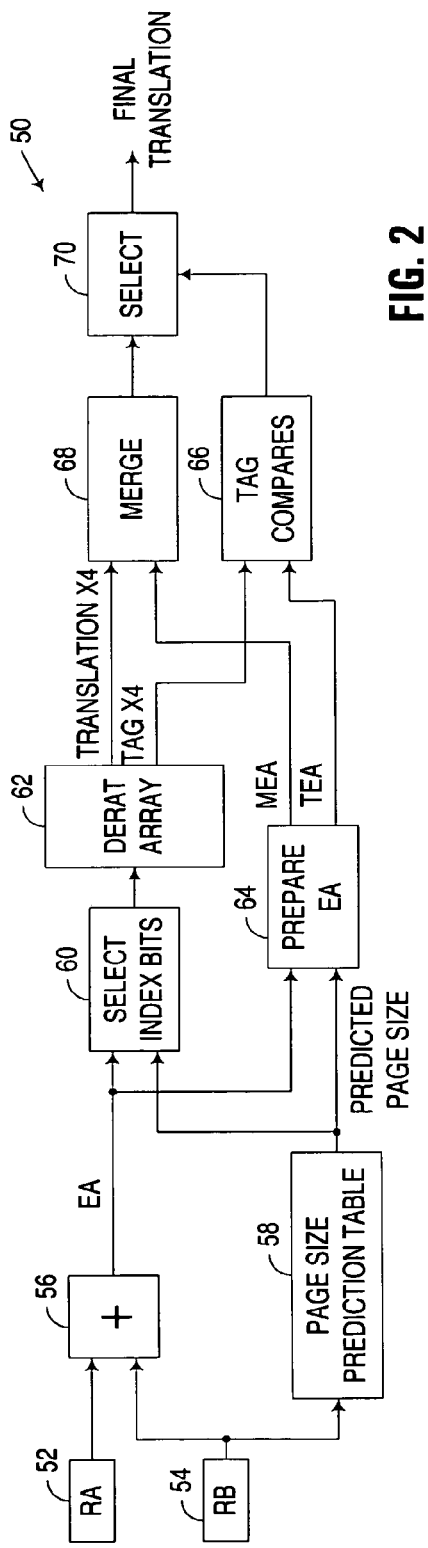
FIG. 2 is a block diagram of one exemplary implementation of the data address translation logic of FIG. 1.

Now turning to FIG. 2, one exemplary implementation of address translation logic suitable for use in apparatus 10 of FIG. 1 is illustrated at 50. In this implementation, address translation logic 50 is utilized for data address translation, that is, to perform a translation of the target addresses of memory access instructions, provided as effective addresses, into real addresses. Page size prediction is overlapped with effective address generation in this embodiment to provide a predicted page size for use in accessing an address translation data structure, such as DERAT array 62 of FIG. 2.

By overlapping page size prediction with effective address generation, the additional logic in the critical path of the address translation logic is minimized. As will become more apparent below, in other embodiments consistent with the invention, page size prediction can be overlapped with other operations in an address translation critical path such that a predicted page size is available to the address translation logic with little or no latency added to access an address translation data structure such as a DERAT array.

In the embodiment of FIG. 2, for example, effective address generation is implemented as illustrated at 56 as the addition of an address stored in a base register ($R_B$) 54 to an offset stored in another register (e.g., $R_A$ register 52) or provided as an immediate value. In the embodiment of FIG. 2, a page size is predicted by accessing a page size prediction table 58 using the address stored in base register 54.

The embodiment of FIG. 2 relies on the fact that the effective addresses of load and store instructions in many processor architectures are often produced by adding a relatively small offset value provided as an immediate value or stored in a register to a base address stored in another register. In a high percentage of cases, the addition of the relatively small value will not cause the page size to change. As a result, logic 50 predicts page size by performing a lookup of the page size prediction table 58 using only the value stored in the base register 54.

In some embodiments, it may be necessary to determine or otherwise know which register is the base register, and which is the offset, for instructions for which the effective address is based upon the addition of two registers. In many embodiments, this requirement is not particularly problematic for a number of reasons. For one reason, in almost all cases of common languages, the compiler knows which input is which, and habitually uses a particular register input in an instruction as the base register. If desired, a compiler may even be specifically designed and configured to optimize a program for an environment incorporating the herein-described address translation logic, to route whenever possible the base address to one or more registers that are architected for use in connection with page size prediction.

Another reason is that even if the base register is not known, it will often be possible to tell which register is which from the values, for instance by looking for a small integer values that are more likely to be offsets rather than base addresses. Yet another reason is that it is often possible predict, either on a per-thread basis, or possibly per-register or per-instruction basis, which register is the base register.

Page size prediction table 58 may be implemented in a number of fashions, e.g., as a form of speculative segment lookaside buffer (SLB) that predicts page sizes of certain segments of memory. When implemented as a speculative SLB, the page size prediction table typically caches all or a portion of the entries in a real SLB, but since the page size is predicted/speculative, there is often no need to keep this speculative SLB precisely coherent with the real SLB, so a lazy algorithm may be used to synchronize the speculative SLB with the real SLB outside of the critical path for address translation. Lack of coherence between a real SLB and a speculative SLB, in particular, does not present a significant concern given that a mispredict on page size prediction table 58 typically also results in a miss on the DERAT, array 62, so there is little risk that a mispredict will cause an erroneous translation to be performed. Also, when implemented as a cache-type structure, any techniques conventionally used in connection with caching, e.g., hashing, set associativity, etc., may be implemented in a page size prediction table consistent with the invention.

Furthermore, it may also be desirable to use a partially tagged or untagged page table prediction table in such an implementation. For example, table 58 may be implemented as a simple array of n-bit counters (similar to a branch predictor) to support up to $2^n$ different page sizes, with the array being accessed via a set of bits stored in base register 54, e.g., according to a hashing algorithm. In one embodiment, for example, table 58 may be implemented as a 32-entry array of 2-bit entries indexed by 5 bits from the base address, whereby up to four pages sizes are supported. Assuming, for example, that 256 MB segments are defined in a particular system, and that 64-bit addressing is used, bits 31-35 (where bit 63 is the LSB) may be used to index table 58.

It will be appreciated that other data structures may be utilized to implement page size prediction table 58 consistent with the invention. As one example, a data structure may store define ranges of memory addresses assigned to particular page sizes, whereby a simple address compare may be used to determine a predicted page size. As another example, one or more range registers may be used to define boundaries between regions of memory assigned to particular page sizes, which would be similarly accessible via an address compare operation.

Updating of the page size prediction table may be performed, for example, in connection with a miss to the DERAT, e.g., after a real SLB has been accessed to determine the correct size for the relevant page. Other manners of updating the page size prediction table, e.g., accessing the real SLB in parallel with the translation process, comparing the retrieved page size with the predicted page size, and updating the predicted page size as necessary, may be used in the alternative.

Referring again to FIG. 2, effective address generation in block 56 and page size prediction via table 58 are overlapped, and the outputs of both are each fed to a select index bits block 60 and a prepare effective address block 64. Select index bits block 60 outputs selected index bits from the generated effective address to select an entry (or in the case of a set associative DERAT, a set of entries) in DERAT array 62. Of note, block 60 represents an increase in path length over accessing a DERAT in conventional single-page size address translation logic. However, this increase in path length is generally significantly shorter than the increase in path length in conventional multi-page size address logic that obtain a real (non-speculative) page size using a generated (non-speculative) effective address.

Figure 3:
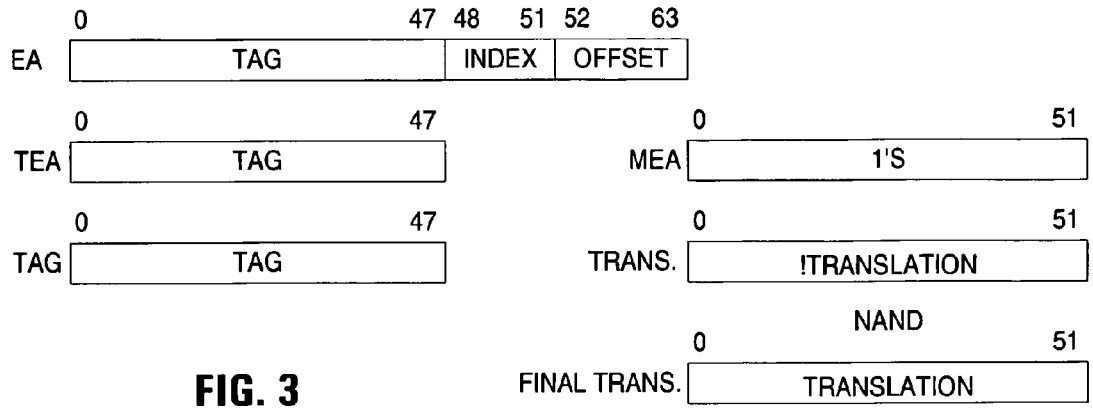
FIG. 3 illustrates exemplary bit mappings associated with performing address translation of an effective address mapped to a 4 KB page size using the data address translation logic of FIG. 2.
Figure 4:
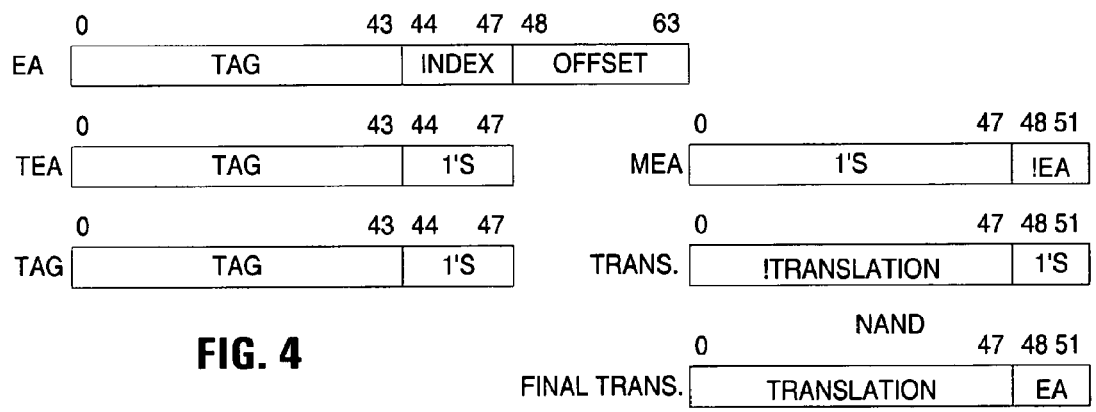
FIG. 4 illustrates exemplary bit mappings associated with performing address translation of an effective address mapped to a 64 KB page size using the data address translation logic of FIG. 2.
Figure 5:
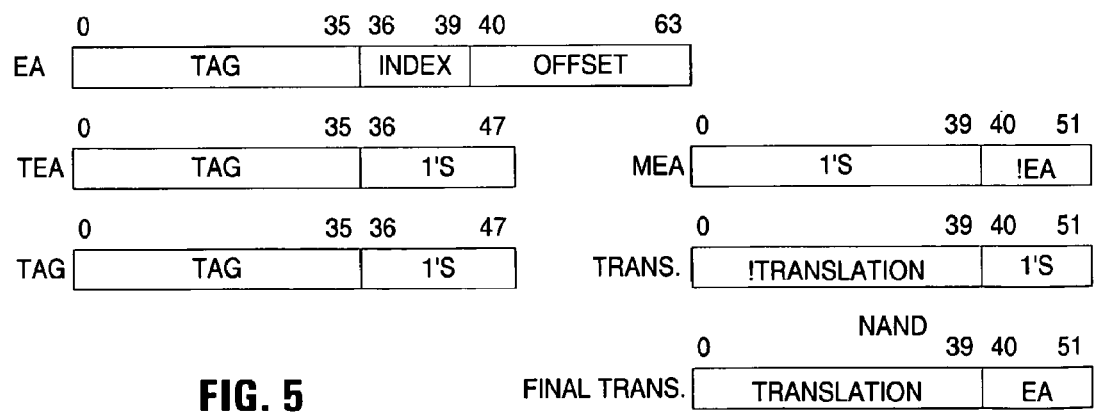
FIG. 5 illustrates exemplary bit mappings associated with performing address translation of an effective address mapped to a 16 MB page size using the data address translation logic of FIG. 2.

The particular index bits passed to DERAT array 62 by block 60 are selected based upon the predicted page size output from table 58. In an exemplary environment discussed hereinafter, DERAT 62 may be implemented as a 4 way set associative data structure with 16 entry sets, thus requiring four index bits to access the array. Moreover, three page sizes, 4 KB, 64 KB and 16 MB, are supported in the exemplary environment. Referring to FIGS. 3-5, exemplary bit mappings for various values and data structures utilized in connection with performing address translation in such an environment are illustrated in greater detail. Assuming, for example, that 64-bit addressing is used for effective addresses, as shown in FIG. 3, for a 4 KB page size, the effective address (EA) may include 12 offset bits (bits 52-63, where bit 63 is the LSB), with bits 48-51 assigned as index bits into array 62. Likewise, as shown in FIG. 4, for a 64 KB page size, the effective address (EA) may include 16 offset bits (bits 48-63), with bits 44-47 assigned as index bits into array 62. Also, as shown in FIG. 5, for a 16 MB page size, the effective address (EA) may include 24 offset bits (bits 40-63), with bits 36-39 assigned as index bits into array 62.

Returning to FIG. 2, therefore, for a predicted page size of 4 KB, block 60 is configured to pass bits 48-51 of the effective address to array 62, for a predicted page size of 64 KB, block 60 is configured to pass bits 44-47 of the effective address to array 62, and for a predicted page size of 16 MB, block 60 is configured to pass bits 36-39 of the effective address to array 62. In such an environment, therefore, block 60 may be implemented, for example, as a 3:1 multiplexer, or alternatively, as a pair of 2:1 multiplexers, since the 16 MB page index bits will generally be provided later than the index bits for the other page sizes when using any of a number of conventional high speed adder designs for block 56 (which typically operate by outputting lower order bits first). Other logic may be used to implement block 60 in the alternative.

Based upon the index bits passed to DERAT array 62, a set of (in this implementation, four) entries, each including a tag and a translation value, are output by the array. The tag values are provided to a tag compares block 66, while the translation values are provided to a merge block 68.

Prepare effective address block 64 also outputs a tag portion of the effective address (designated as TEA) to block 68. Also provided by block 64 to merge block 68 is a mask portion of the effective address (designated as MEA).

The size of the TEA value output by block 64 corresponds to the size of the tag for the smallest supported page size (e.g., 48 bits in the illustrative embodiment). Block 64 is configured to pass all of the corresponding tag bits for the effective address when the smallest page size is predicted (e.g., bits 0-47), and for large predicted page sizes (which have smaller tags), block 64 zeros out all lower order bits (inverted logic is used in the illustrated implementation, so zeroing out the lower order bits results in all 1's being stored in those bit locations). As such, for 64 KB page sizes, TEA includes bits 0-43 of the effective address, with bits 44-47 zeroed out, and for 16 MB page sizes, TEA includes bits 0-35 of the effective address, with bits 36-47 zeroed out.

Likewise, within each array entry, the corresponding tag for that entry is the same size as the tag for the smallest supported page size (e.g., 47 bits), with any unused bits for that page size zeroed out (set to all 1's using inverted logic).

It may also be desirable to encode within the tag for each entry the page size for the page associated with the entry, and to encode within the TEA value the predicted page size, which typically results in a DERAT miss occurring if the page size is mispredicted. In other embodiments, the page size for each entry may be stored separate from the tag, and the predicted page size may be compared with the stored page sizes separate from a tag compare operation.

Tag compares block 66 essentially compares the tag values output by array 62 with the TEA value, outputting a select signal to a select block 70 for whichever tag value matches the TEA value, such that the corresponding translation output by merge block 68 will be passed as the final translation by block 70. Also, if no tag value matches the TEA value, a miss to the DERAT array has occurred, and an appropriate signal is output by block 66 to initiate handling of the DERAT miss, and if necessary, updating the page size prediction table accordingly. In the illustrated embodiment, block 70 may be implemented as a 4:1 multiplexer, with the signal output by block 66 used to select one of the four merged outputs from block 68.

In some embodiments, a miss on the DERAT, as indicated by block 66, may be erroneous in the event of a mispredicted page size. In some embodiments, the miss may nonetheless be processed such that a fill to the DERAT is performed with the appropriate entry set. In other embodiments, however, it may be desirable to determine if the page size was mispredicted (e.g., by accessing the real SLB), and then aborting the ERAT fill and reaccessing the DERAT with the corrected page size.

Merge block 68 generally operates by combining the translation values output by the DERAT array with the offset portion of the effective address, outputting merged values for each of the translation values. Of note, given that a certain number of bits in the effective address (typically the offset bits for the smallest supported page size, e.g., bits 52-63 in this embodiment) will always be offset bits irrespective of page size, these bits may be supplied directly from the output of block 56 as the comparable bits in the final translation, so the combination performed in merge block 68 may be limited to merging the additional offset bits required for larger page sizes. As such, in the embodiment discussed herein, the MEA value output by block 64, and the translation values output by array 62, exclude each of these offset bits, thus leaving these values 52 bits in size. For the final translation, the output of block 70 is simply combined with these lower order offset bits to generate the final 64 bit value. As such, the bit mappings of the MEA, translation and final translation values of FIGS. 3-5 exclude these lower order offset bits. It will be appreciated, however, that these offset bits may be passed, for example, through blocks 64, 68 and 70 to generate the final translation in other embodiments. Moreover, it should also be noted that the merge operation performed by block 68 operates in parallel with the tag compare operation, and as such, typically does not have an appreciable effect on the critical path.

In one embodiment, block 68 is implemented using inverted logic, whereby the combinations of the translation values and MEA are performed using NAND gates. As such, each translation value output by array 62 may be stored as the logical inversion of the translation (!TRANSLATION in FIGS. 3-5), with each of the bits between the least significant index bit for that particular page size and the least significant index bit for the smallest supported page size (e.g., no bits for 4 KB pages, bits 48-51 for 64 KB pages, and bits 40-51 for 16 MB pages) set to all 1's.

Likewise, for the MEA value generated by block 64, a logically inverted version (!EA) of the higher order offset bits for the effective address above the highest order offset bit for the smallest page size (e.g., no bits for 4 KB pages, bits 48-51 for 64 KB pages, and bits 40-51 for 16 MB pages) is generated along with a mask of all 1's is used for each higher order bit above the highest order offset bit.

As a result, when the MEA value and each translation value are NAND'ed together by merge block 68, the resulting merged values include the translation combined with the relevant offset values for the page size at issue. For a 4 KB page (FIG. 3), the final translation includes translation information for each of bits 0-51. For a 64 KB page (FIG. 4), the final translation includes translation information for each of bits 0-47, with offset bits from the effective address stored in bits 48-51. Likewise, for a 16 MB page (FIG. 5), the final translation includes translation information for each of bits 0-39, with offset bits from the effective address stored in bits 40-51.

Figure 6:
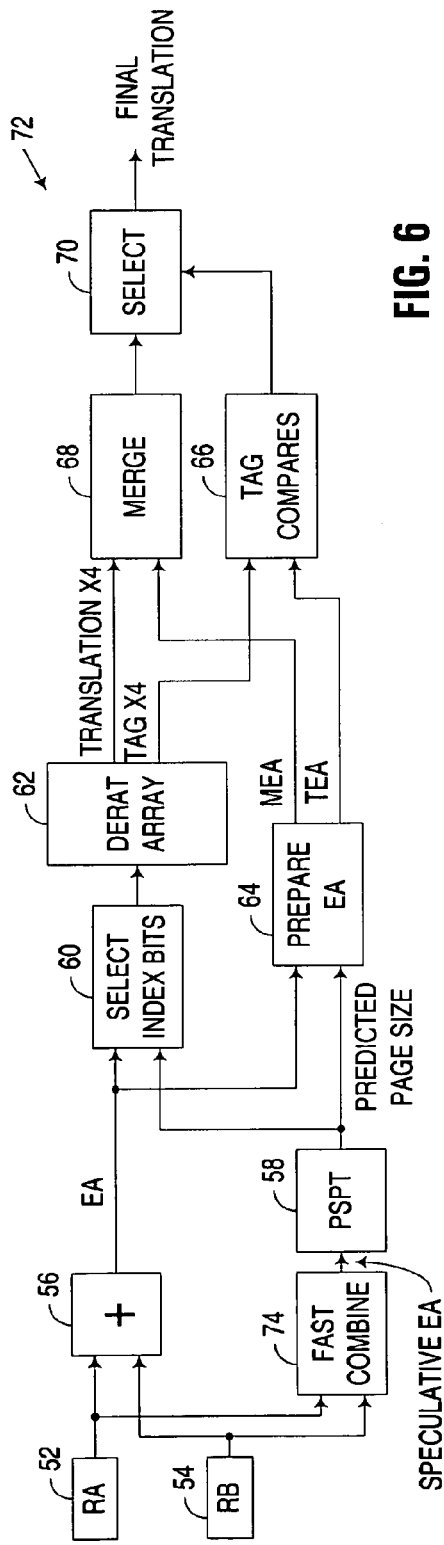
FIG. 6 is a block diagram of one alternate exemplary implementation of the data address translation logic of FIG. 2, incorporating fast combine logic to generate a speculative effective address.

A number of alternate manners of implementing page size prediction may be used in other embodiments consistent with the invention. For example, as shown in FIG. 6, it may be desirable to utilize in address translation logic 72, fast combine logic 74 that generates a speculative effective address from both of registers 52 and 54 for use in accessing page size prediction table 58. In this regard, a speculative effective address consistent with the invention may be considered to be any combination of the data being used to generate an actual effective address, short of performing a full addition or other operation required to generate the actual effective address. In the embodiment of FIG. 2, a base address, which is not combined with any information from the offset value stored in the other register (or provided as an immediate value), operates as a speculative effective address. Likewise, fast combine logic 74 of FIG. 6 performs a similar function, by partially combining the base register with the other register (or with an intermediate value) in a manner that the page size prediction table can be accessed prior to completing the generation of the effective address in block 56.

As one example, fast combine logic 74 may be implemented as a faster addition of a subset of the bits stored in registers 52 and 54, e.g., only the highest order bits that might result in movement to a different page from that pointed to by the base register. In such an embodiment, the lower order bits from the base register may be passed directly to table 58, and it would be assumed that any carry generated by the addition of the lower order bits would be disregarded by block 74. Given that the latency of an adder typically increases with the number of bits to be added, the addition of a small subset of bits would likely complete before the generation of the effective address in block 56 was complete. An advantage of this embodiment would be that, should the offset being added to the base register be relatively large, and thus contribute to the upper order bits of the effective address once generated, the addition of the upper order bits (even if any carry from the lower order bit addition was disregarded) would result in a more reliable speculative effective address that would have a greater likelihood of accurately predicting the page size than simply using just the base address.

As another example, fast combine logic 74 may be implemented using base address selection logic, which outputs the value stored in one of registers 52 and 54 based upon which is determined to be the base address. As noted above, in many instances, a base address can be distinguished from an offset value based upon the size of the value, as an offset value is usually significantly smaller than a base address. As a result, fast combine logic 74 may simply determine which of the values in registers 52 and 54 is larger, and output that value as the speculative effective address.

Figure 7:
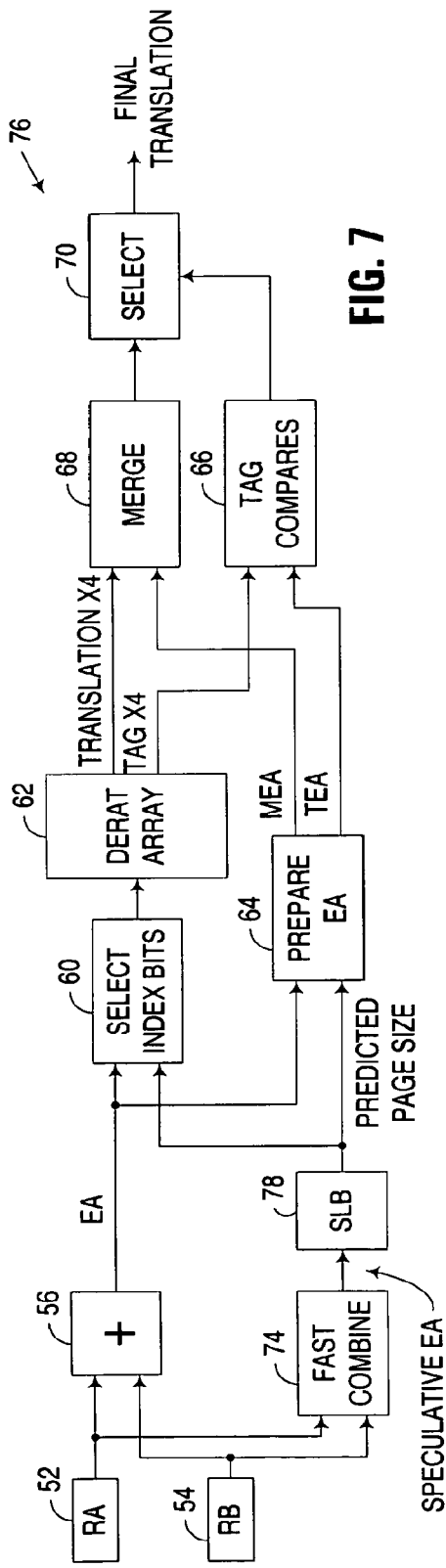
FIG. 7 is a block diagram of yet another alternate exemplary implementation of the data address translation logic of FIG. 2, incorporating fast combine logic to generate a speculative effective address, coupled with an access to a segment lookaside buffer.

As another alternative, FIG. 7 illustrates another address translation logic implementation 76 that utilizes fast combine logic 74, and thus the speculative effective address generated thereby, to access an actual SLB 78. Thus, rather than using a data structure of predicted page sizes, the actual page size for a given segment can be retrieved. Given, however, that a speculative effective address is used to access the SLB, the page size retrieved from the SLB is still predictive or speculative in nature. Moreover, a performance advantage is still obtained over a lookup to the SLB using the actual effective address generated by block 56, since the lookup using the speculative effective address can be initiated prior to completion of the effective address generation. Of note, it may also be desirable to omit block 74 from implementation 76, and simply use the base address stored in register 54 as the speculative effective address, similar to implementation 50 of FIG. 2.

Figure 8:
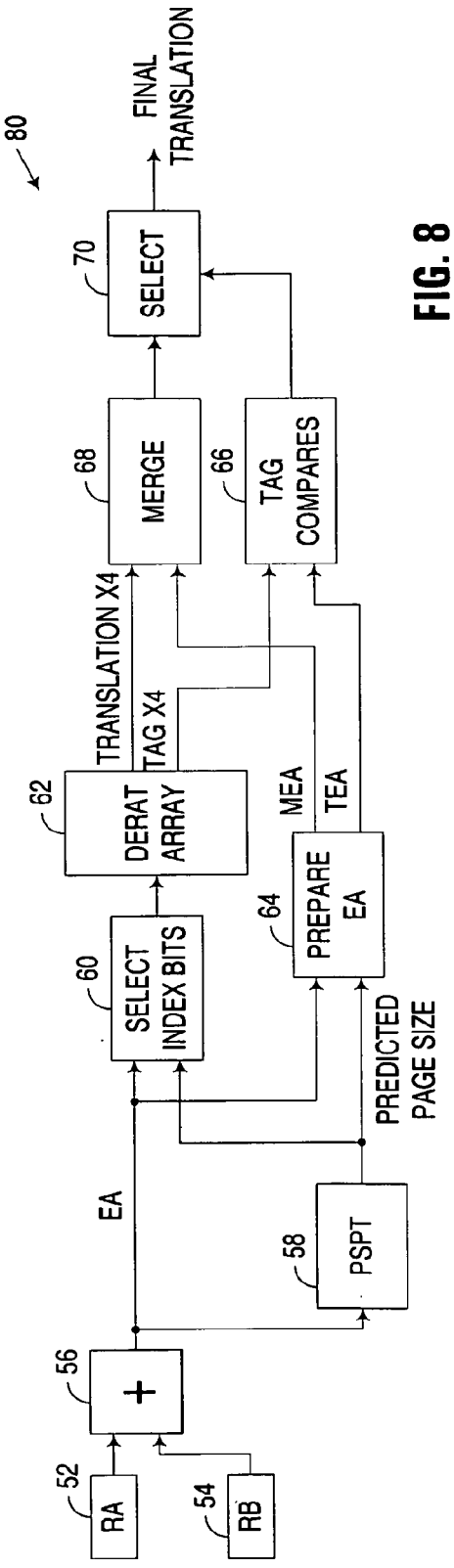
FIG. 8 is a block diagram of another exemplary implementation of the data address translation logic of FIG. 2, incorporating an access to a page size prediction table using an actual effective address.

As yet another alternative, FIG. 8 illustrates another address translation logic implementation 80 that uses the actual effective address generated by block 58 to access page size prediction table 58. Thus, rather than using a speculative effective address, the actual effective address is used. Assuming, however, that the page size prediction table stores predicted page sizes, the page size retrieved from the page size prediction table is still predictive or speculative in nature. Moreover, a performance advantage is still obtained over a lookup to the SLB, given that the page size prediction table can be implemented as a smaller, higher speed circuit that can be accessed much quicker than would be required to access the comparatively larger and slower SLB.

Figure 9:
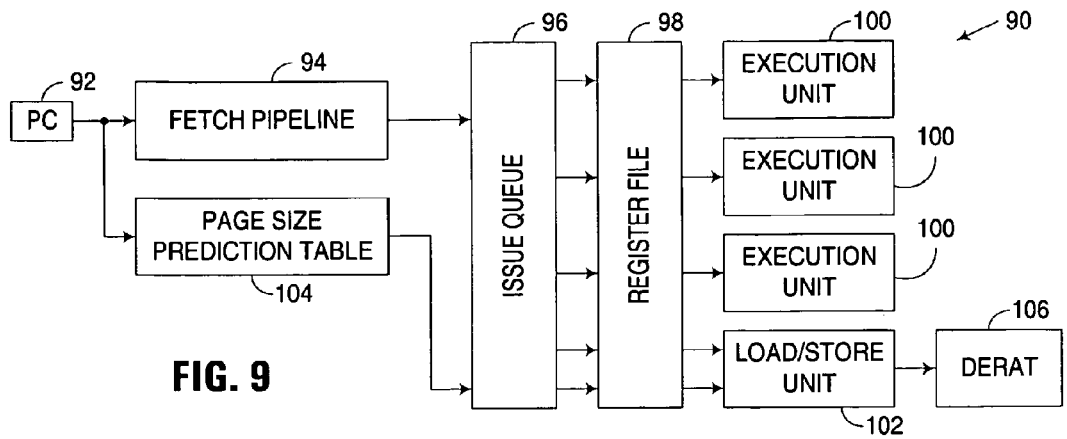
FIG. 9 is a block diagram of an exemplary implementation of instruction-based page size prediction logic.

As yet another embodiment, rather than basing page size prediction upon the target address associated with a particular instruction, it may be desirable to predict page size based upon the instruction itself, e.g., based upon the address at which the instruction is stored. FIG. 9, for example, illustrates an exemplary processor 90 including a program counter 92 that feeds a fetch pipeline 94, which subsequently issues instructions to an issue queue 96 that accesses registers arranged in a register file 98. The instructions are passed via issue queue 96 to one or more execution units 100. In addition, load/store instructions are passed to a load/store unit 102, which accesses a DERAT 106 to translate target addresses to real addresses for accessing target data.

A page size prediction table 104 is also provided in processor 90, and fed through blocks 96 and 98 to unit 102 for use in accessing DERAT 106, in much the same manner as described in the other implementations above. However, rather than using the target address of an instruction to access table 104, the actual address of the instruction, as represented by the program counter 92, is used to access the table. Table 104 may be loaded with the size of the page last accessed by the instruction, and thus be based upon instruction history, such that subsequent executions of that instruction predict the same page size. Such an implementation may be useful, for example, in program loops, where the same instruction may repeatedly access the same segment of memory. While various manners of loading the table may be used, one such manner would be to write the page size for the target address of the instruction once the instruction has been executed, into an entry in the table addressed via a hash of the program counter (e.g., using bits 51-61 of the program counter to access a 2048 entry page size prediction table).

Figure 10:
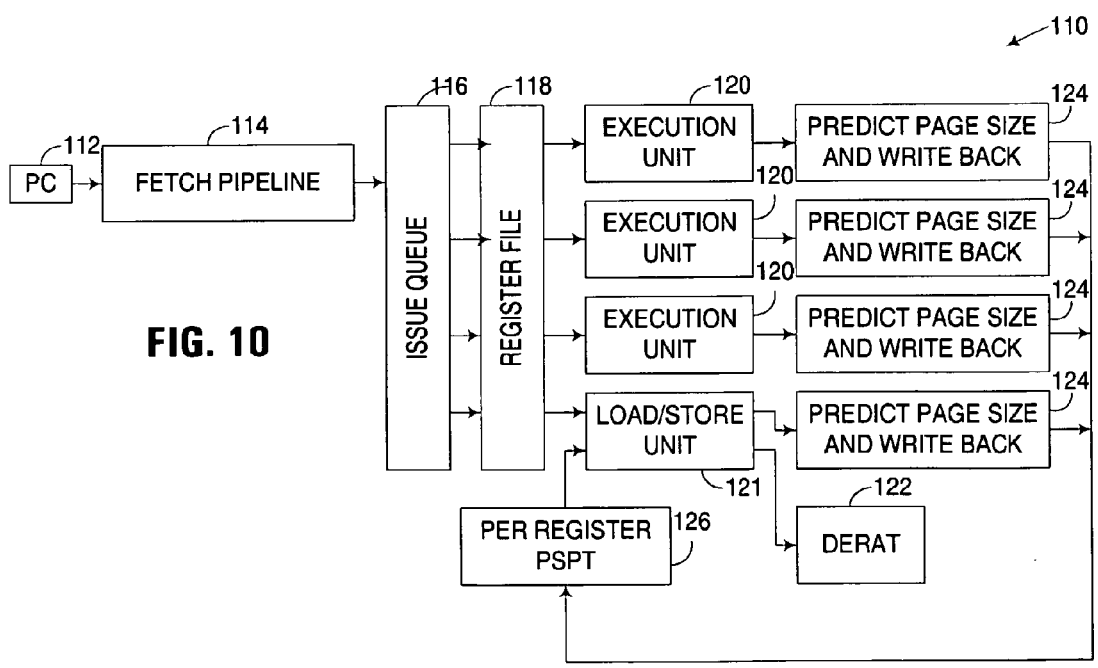
FIG. 10 is a block diagram of an exemplary implementation of register-based page size prediction logic.

As another alternative, while a number of the embodiments discussed above store page size data from the SLB in the page size prediction table, it will be appreciated that other page size prediction data may be generated in the alternative, and used in page size prediction table implemented in such embodiments. For example, page size prediction data may be based upon prior register values. In one implementation, for example, the page size for the last access to a base register may be used to predict the page size for another access to the base register. As another alternative, as shown in FIG. 10, page size prediction may be based upon specific values associated with one or more registers. FIG. 10, in particular, illustrates a processor 110 incorporating a program counter, fetch pipeline 114, issue queue, 116, register file 118, execution units 120, load store unit 121 and DERAT 122. Processor 110 also includes a page size prediction table 126; however, this table stores prediction data for each register (or for a subset of all registers), indexed on value (or some hash of the same). Blocks 124 are associated with each execution unit 120 and load/store unit 121, and are used to predict a page size for every integer value produced, and write the predicted page size into each architected integer register. The page size prediction data is then retrieved from table 126 by load/store instructions in connection with retrieving the value from the appropriate register, for use in accessing DERAT 122. It will be appreciated that predictions may be one or more cycles out of date in some instances, which may run the risk of a register value being changed between when the page size prediction data for that register was written and when it is used by a later instruction.

It will be appreciated that implementation of the functionality described above in one or more integrated circuits would be well within the abilities of one of ordinary skill in the art having the benefit of the instant disclosure. It will also be appreciated that various additional modifications may be made to the illustrated embodiments consistent with the invention. Therefore, the invention lies in the claims hereinafter appended.

What is claimed is:

1. A method of performing address translation for a memory access instruction, the method comprising:

predicting a page size for a page of memory being accessed by a memory access instruction;

translating a first address associated with the memory access instruction to a second address by accessing an address translation data structure using the predicted page size; and using the predicted page size to generate a mask that is combined with a translation output by the address translation data structure to generate the second address.

2. The method of claim 1, wherein predicting the page size includes predicting the page size using a base address associated with the memory access instruction.

3. The method of claim 2, wherein the memory access instruction is associated with an offset value that is combined with the base address to generate the first address, and wherein predicting the page size is performed concurrently with combining the offset value with the base address to generate the first address.

4. The method of claim 3, wherein the base address is obtained from a first register identified by the memory access instruction, and wherein the offset value is obtained from one of a second register and an immediate value identified by the memory access instruction.

5. The method of claim 4, wherein the offset value is obtained from the second register, the method further comprising determining whether the base address is stored in the first or second register.

6. The method of claim 3, further comprising generating the first address by adding the offset value to the base address, wherein predicting the page size includes combining the base address and the offset value to generate a speculative address that is used to access a page size prediction data structure to predict the page size, wherein combining the base address and offset value to generate the speculative address is completed prior to generating the first address.

7. The method of claim 1, further comprising generating the first address for the memory access instruction, wherein predicting the page size is performed concurrently with generating the first address.

8. The method of claim 1, further comprising generating the first address for the memory access instruction, wherein predicting the page size is initiated prior to completing a generation of the first address.

9. The method of claim 1, wherein predicting the page size comprises generating a speculative address associated with the memory access instruction and accessing a segment lookaside buffer (SLB) using the speculative address.

10. The method of claim 1, wherein predicting the page size comprises accessing a page size prediction data structure that includes predicted page size information.

11. The method of claim 10, further comprising generating the first address for the memory access instruction, wherein accessing the page size prediction data structure includes accessing the page size prediction data structure using the first address.

12. A method of performing address translation for a memory access instruction, the method comprising:
predicting a page size for a page of memory being accessed by a memory access instruction, wherein predicting the page size comprises accessing a page size prediction data structure that includes predicted page size information;
translating a first address associated with the memory access instruction to a second address by accessing an address translation data structure using the predicted page size, wherein accessing the page size prediction data structure comprises accessing a speculative segment lookaside buffer (SLB);
accessing a non-speculative SLB to confirm the predicted page size; and
updating the speculative SLB responsive thereto.

13. The method of claim 12, further comprising, in response to a miss to the address translation data structure, accessing the non-speculative SLB to determine an actual page size, aborting a fill of the address translation data structure, and reaccessing the address translation data structure using the actual page size.

14. The method of claim 1, wherein the address translation data structure comprises an Effective-to-Real Address Translation (ERAT) data structure, wherein the first address is an effective address, and wherein the second address is a real address.

15. The method of claim 1, wherein accessing the address translation data structure using the predicted page size includes using the predicted page size to select index bits from the first address for use in accessing the address translation data structure.

16. The method of claim 1, further comprising, using the predicted page size to generate a tag that is compared to a tag output by the address translation data structure.

17. A method of performing address translation for a memory access instruction, the method comprising:
predicting a page size for a page of memory being accessed by a memory access instruction, wherein predicting the page size is based upon an address at which the memory access instruction is located; and
translating a first address associated with the memory access instruction to a second address by accessing an address translation data structure using the predicted page size.

18. The method of claim 1, wherein predicting the page size is based upon an instruction history for the memory access instruction.

19. A circuit arrangement implemented in hardware, comprising:
an address translation data structure configured to translate an address associated with a memory access instruction, the address translation data structure supporting multiple page sizes; and
page size prediction logic configured to generate a predicted page size for a page of memory being accessed by the memory access instruction, wherein the predicted page size is used in accessing the address translation data structure, wherein the page size prediction logic is configured to predict the page size by generating a speculative address associated with the memory access instruction and accessing a segment lookaside buffer (SLB) using the speculative address.

20. The circuit arrangement of claim 19, wherein the page size prediction logic is configured to predict the page size by predicting the page size using a base address associated with the memory access instruction.

21. The circuit arrangement of claim 20, wherein the memory access instruction is associated with an offset value that is combined with the base address to generate the first address, and wherein the page size prediction logic is configured to predict the page size concurrently with combination of the offset value with the base address to generate the first address.

22. The circuit arrangement of claim 21, wherein the page size prediction logic is configured to generate the first address by adding the offset value to the base address, and wherein the page size prediction logic is configured to predict the page size by combining the base address and the offset value to generate a speculative address that is used to access a page size prediction data structure to predict the page size, wherein the page size prediction logic is configured to complete combining the base address and offset value to generate the speculative address prior to generation of the first address is complete.

23. The circuit arrangement of claim 19, wherein the page size prediction logic is configured to predict the page size by accessing a page size prediction data structure that includes predicted page size information.

24. A circuit arrangement implemented in hardware, comprising:

an address translation data structure configured to translate an address associated with a memory access instruction, the address translation data structure supporting multiple page sizes; and page size prediction logic configured to generate a predicted page size for a page of memory being accessed by the memory access instruction, wherein the predicted page size is used in accessing the address translation data structure, and wherein the page size prediction logic is configured to predict the page size based upon an address at which the memory access instruction is located.

25. An apparatus comprising the circuit arrangement of claim 19.

26. An integrated circuit device comprising the circuit arrangement of claim 19.

27. A program product, comprising a hardware definition program that defines the circuit arrangement of claim 19; and a computer readable signal bearing medium bearing the hardware definition program, wherein the signal bearing medium includes a recordable type media.

* * * * *